United States Patent [19]

Lee

[11] Patent Number: 5,833,163
[45] Date of Patent: Nov. 10, 1998

[54] REEL TABLE DRIVING APPARATUS FOR TAPE CASSETTE RECORDER

[75] Inventor: Jung-Jae Lee, Seoul, Rep. of Korea

[73] Assignee: Samsung Electronics Co., Ltd., Kyungki-do, Rep. of Korea

[21] Appl. No.: 694,111

[22] Filed: Aug. 8, 1996

[30] Foreign Application Priority Data

Sep. 19, 1995 [KR] Rep. of Korea ................. 1995-30673

[51] Int. Cl.$^6$ ................................................. G11B 15/30
[52] U.S. Cl. ........................................................ 242/356.5
[58] Field of Search ............................... 242/356, 356.3, 242/356.5, 356.7; 360/95.4

[56] References Cited

U.S. PATENT DOCUMENTS

| | | | |
|---|---|---|---|
| 3,976,263 | 8/1976 | Suzuki | 242/356.5 |
| 5,003,418 | 3/1991 | Yang | 242/356.5 |
| 5,230,483 | 7/1993 | Kang | 242/356.3 |
| 5,295,639 | 3/1994 | Kurokawa et al. | 242/356.3 |

*Primary Examiner*—John P. Darling
*Attorney, Agent, or Firm*—Sughrue, Mion, Zinn, Macpeak & Seas, PLLC

[57] ABSTRACT

A reel table driving apparatus for a tape cassette recorder includes a main plate, a reel table having a reel disk rotatably installed on the main plate, a driving gear coaxially combined with the reel disk, for transmitting a driving force, and a friction gear having a larger diameter than that of the driving gear, for transmitting the driving force to the reel disk by a frictional engagement with the driving gear. The apparatus further includes a first intermediate gear selectively engaged with the friction gear, a second intermediate gear which is engaged with the driving gear, elevating means for elevating the first intermediate gear to be engaged with the friction gear in a low-speed, mode and separated from the friction gear in a high-speed mode, and an idler mechanism having a first idler gear corresponding to the first intermediate gear and a second idler gear corresponding to the second intermediate gear, coaxially installed with the first idler gear and having a larger diameter than that of the first idler gear, such that the first idler gear is engaged with the first intermediate gear in the low-speed mode and the second idler gear is engaged with the second intermediate gear in the high-speed mode.

9 Claims, 7 Drawing Sheets

REEL TABLE DRIVING APPARATUS FOR TAPE CASSETTE RECORDER

BACKGROUND OF THE INVENTION

The present invention relates to a reel table driving apparatus for a tape cassette recorder and, more particularly, to a reel table driving apparatus which can selectively transmit power provided from a driving source to a supply reel table or a take-up reel table.

In a magnetic recording/reproducing apparatus, the traveling of a tape wound around the supply and take-up reels of a tape cassette differs in terms of the direction and speed in which it is wound, in accordance with the operation mode. That is, in the playback and review modes, the tape travels at a relatively low speed and at a higher speed in the rewind and fast-forward modes. To accomplish this, conventionally, a clutch is used as speed switching means, which will be described with reference to FIGS. 1 and 2.

Figure 1:
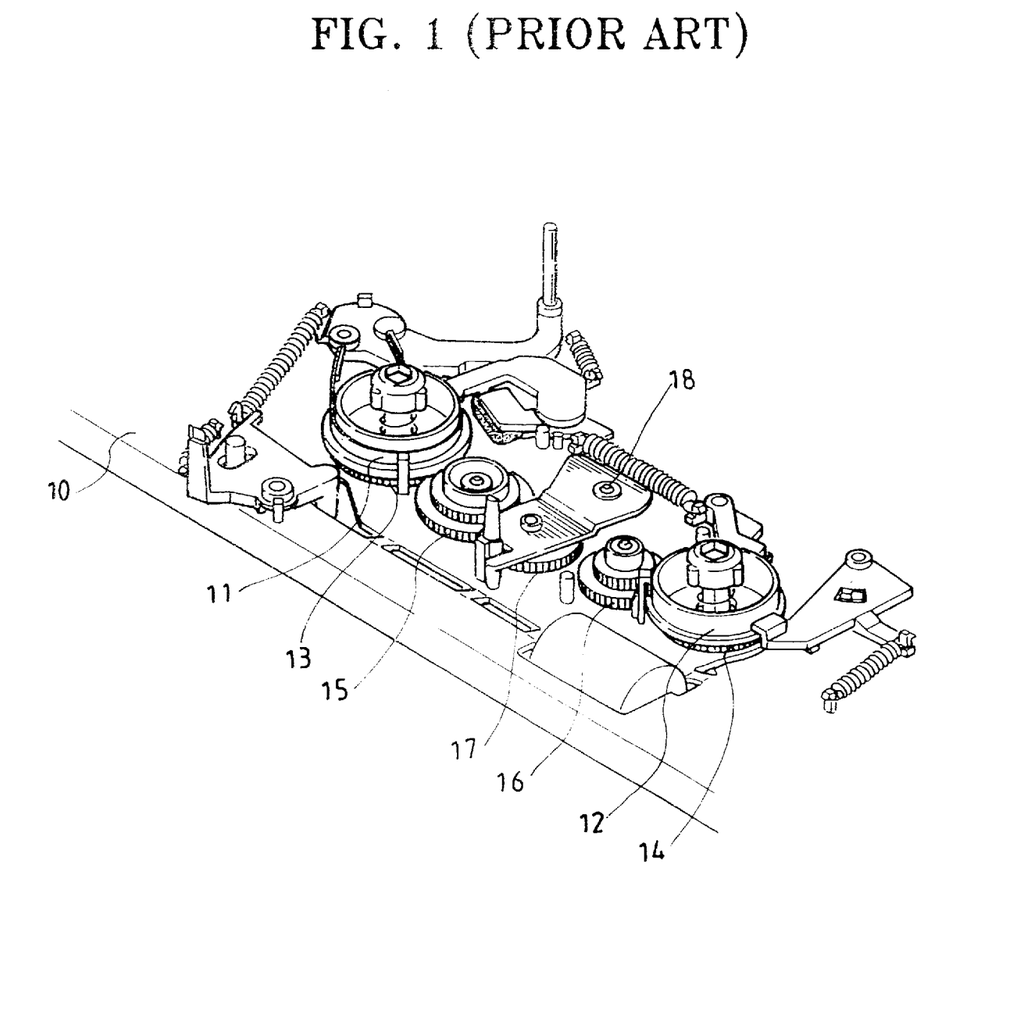
FIG. 1 is a perspective view of a conventional reel table driving apparatus for a tape cassette recorder.

In FIG. 1, supply and take-up reel tables 11 and 12 for respectively seating supply and take-up reels of a tape cassette (not shown) are installed on a main plate 10. Reel gears 13 and 14 rotating while engaged with intermediate gears 15 and 16 are provided on each bottom portion of the reel tables 11 and 12. The respective intermediate gears 15 or 16 are selectively engaged with a first idler gear 17, depending on whether the tape is to travel forward or backward. The first idler gear 17 is rotated by the driving force from a capstan motor (not shown), and pivots toward either the intermediate gear 15 or the intermediate gear 16 centered on an idler shaft 18 according to the rotating direction.

Figure 2:
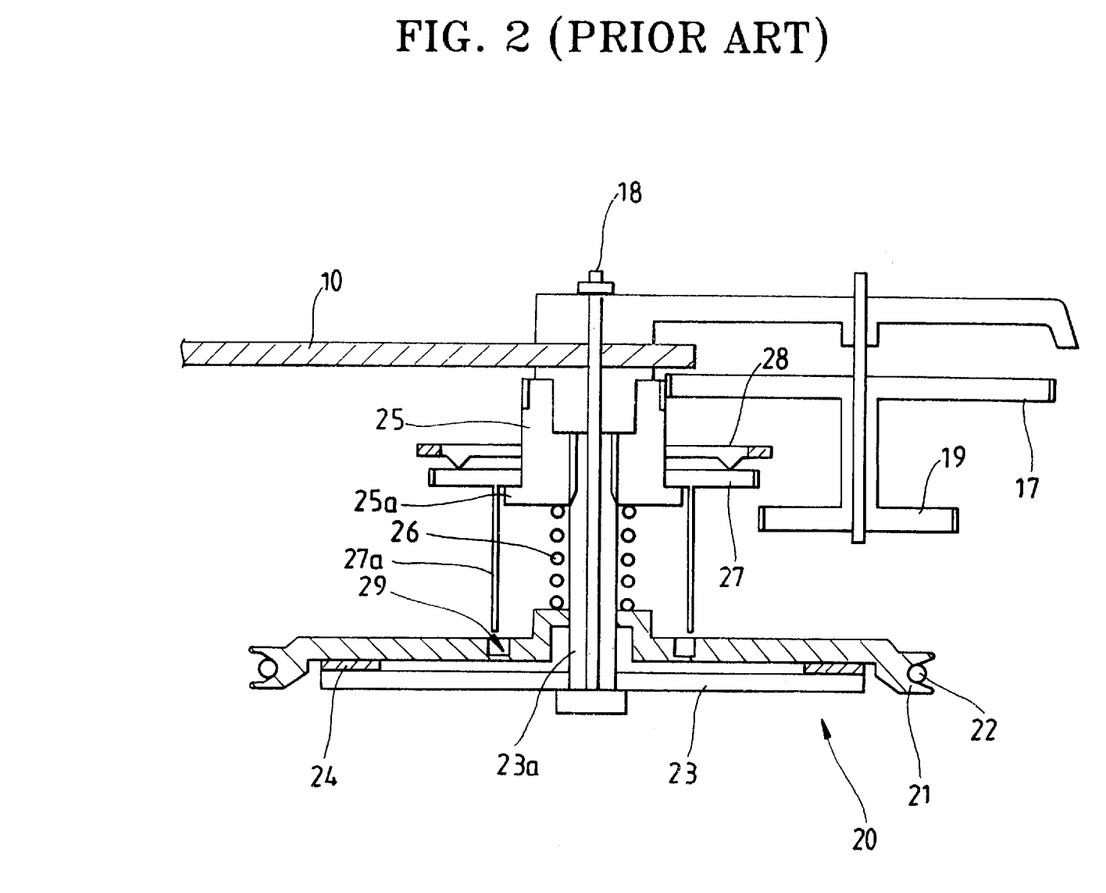
FIG. 2 is a sectional view of a portion of the apparatus in FIG. 1.

Referring to FIG. 2, clutch means 20 is combined with the idler shaft 18 under the main plate 10. The clutch means 20 includes a pulley 21 rotating in conjunction with the capstan motor (not shown) via a belt 22 and a clutch wheel 23. The clutch wheel 23 has a pad 24 installed on its upper surface in contact with the lower surface of the pulley 21. Also, the clutch wheel 23 is connected to a first driving gear 25 supported by a spring 26 around the idler shaft 18 via a wheel shaft 23a having a hollow into which the idler shaft 18 is inserted. The first driving gear 25 always rotates with the clutch wheel 23 and can slide axially with respect to the idler shaft 18. A second driving gear 27 is combined with the outer circumferential surface of the first driving gear 25 by, for example, shrinkage fitting, such that it can be rotated with the first driving gear 25 and supported by a hanging protrusion 25a projected from the lower end of the first driving gear 25. A pressing member 28, for pressing the first and second driving gears 25 and 27 downward by the engagement with a slider (not shown), is installed on the upper surface of the second driving gear 27. The second driving gear 27 can slide with the first driving gear 25 along the idler shaft 18 and has a lock 27a protruded downward which is inserted into a locking groove 29 formed on the upper surface of the pulley 21.

In the conventional reel table driving apparatus having such a configuration, during a low-speed mode (e.g., the playback or review mode), the first driving gear 25 is engaged with the first idler gear 17, as shown in FIG. 2. That is, the driving force of the capstan motor is transmitted in the sequence of the belt 22, to the pulley 21, to the clutch wheel 23, to the first driving gear 25 and to the first idler gear 17. Thereafter, the driving force is transmitted to either the intermediate gear 15 or 16 in mesh with the first idler gear 17 and then to the reel table 11 or 12.

In such a case, since the driving force of the capstan motor is transmitted to the first idler gear 17 with a large diameter via the pad 24 on the clutch wheel 23, the reel table 11 or 12 meshed with the first idler gear 17 is rotated at a low speed. In this case, if an accidental overload condition is placed on the reel tables 11 and 12 so that the rotation of the reel tables is reduced or stopped such that the rotation of the first idler gear 17, first driving gear 25 and clutch wheel 23 also stops, the pad 24 slides on the pulley 21 to thus prevent the stretching and/or breakage of the tape.

Meanwhile, in a high-speed mode (e.g., the rewind or fast-forward mode), the pressing member 28 presses the second driving gear 27 downward. Thus, the first driving gear 25 engaged with the second driving gear 27 is also moved downward, so that the first driving gear 25 is disengaged with the first idler gear 17 and the pad 24 is separated from the lower surface of the pulley 21. The second driving gear 27 descends to be engaged with the second idler gear 19 having a smaller diameter than that of the first idler gear 17, incorporated with the first idler gear 17. At this time, the lock 27a of the second driving gear 27 is inserted into the locking groove 29 on the pulley 21. Thus, the driving force of the capstan motor is transmitted to the belt 22, pulley 21, lock 27a, second driving gear 27, second idler gear 19, and either intermediate gear 15 or intermediate gear 16, and finally to the reel table 11 or 12.

In this case, since the driving force of the capstan motor is transmitted to the second idler gear 19 with a smaller diameter, the reel table 11 or 12 rotates at a high speed.

However, in the conventional reel table driving apparatus, the clutch means is combined on the lower part of the main plate, which constitutes an obstacle to the reduction in thickness of the apparatus. Also, during the fast-forward and rewind modes, the pressing member is always in contact with the rotating second driving gear, which causes the wear of the second driving gear and unstable rotation thereof.

Besides, the lock sometimes does not escape from the locking groove during mode conversion. Therefore, excess tension is applied to a cassette tape, thereby damaging the tape.

SUMMARY OF THE INVENTION

It is an object of the present invention to provide a reel table driving apparatus for a tape cassette recorder which can overcome the height limitation of the apparatus by providing clutch means on a reel table, and prevent excess tension from being applied to a tape.

To accomplish the above object, there is provided a reel table driving apparatus for a tape cassette recorder comprising a main plate, a reel table having a reel disk rotatably installed on the main plate, a driving gear coaxially combined with the reel disk, for transmitting a driving force, and a friction gear having a larger diameter than that of the driving gear, for transmitting the driving force to the reel disk by a frictional engagement with the driving gear. The apparatus further includes a first intermediate gear selectively engaged with the friction gear, a second intermediate gear selectively engaged with the driving gear, elevating means for elevating the first intermediate gear to be engaged with the friction gear in a low-speed mode and separated from the friction gear in a high-speed mode, and an idler mechanism having a first idler gear corresponding to the first intermediate gear and a second idler gear corresponding to the second intermediate gear, coaxially installed with the first idler gear and having a larger diameter than that of the first idler gear, such that the first idler gear is engaged with the first intermediate gear in the low-speed mode and the second idler gear is engaged with the second intermediate gear in the high-speed mode.

BRIEF DESCRIPTION OF THE DRAWINGS

The above object and advantages of the present invention will become more apparent by describing in detail preferred embodiments thereof with reference to the accompanying drawings, in which.

DETAILED DESCRIPTION OF THE PREFERRED EMBODIMENTS

Figure 3:
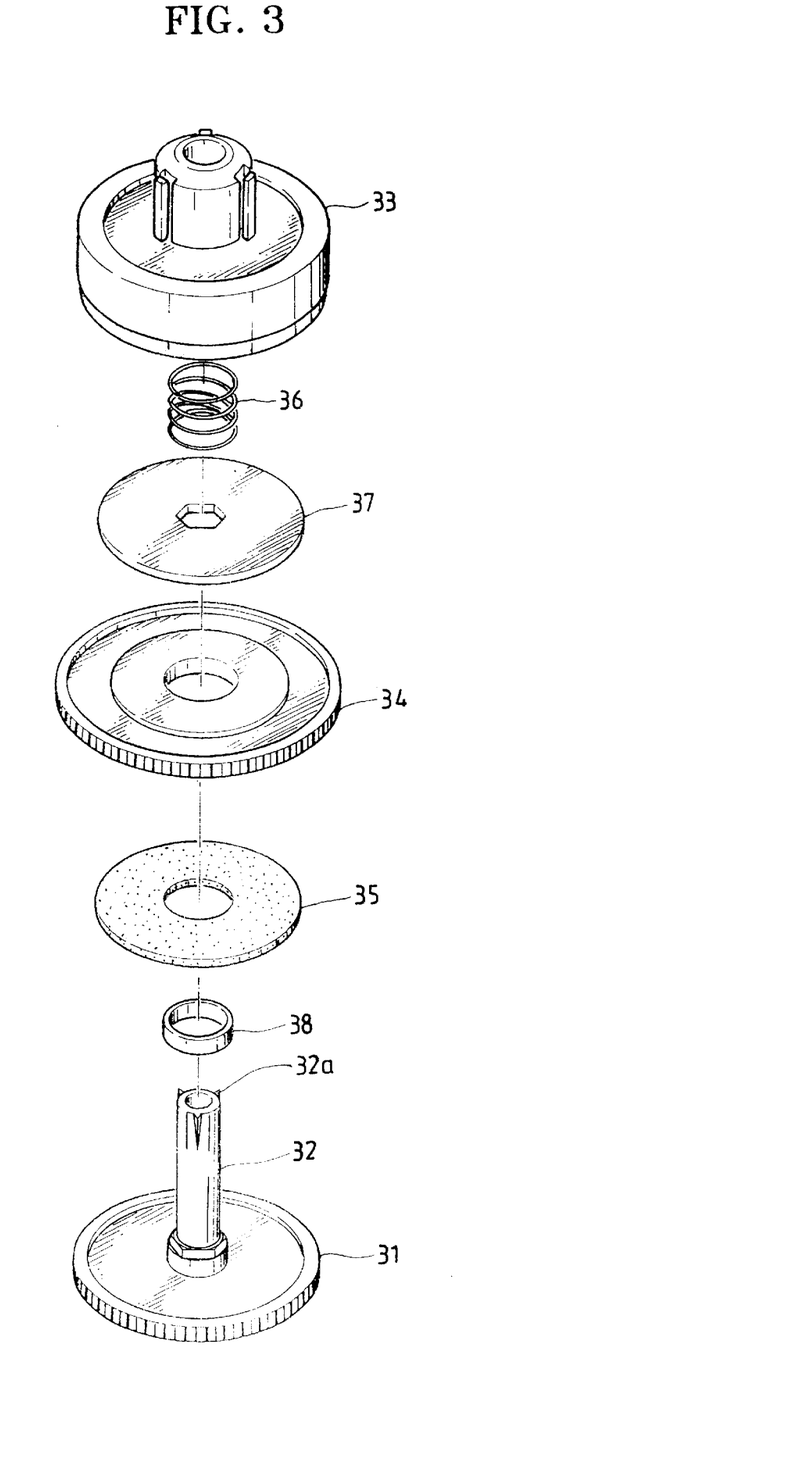
FIG. 3 is an exploded perspective view showing a reel table in a reel table driving apparatus for a tape cassette recorder according to the present invention.

Referring to FIG. 3, in a reel table driving apparatus for a tape cassette recorder according to the present invention, a reel table includes a driving gear 31 having a hollow bushing shaft 32. Ribs 32a to be combined with rib grooves (not shown) formed on the inner circumference of a reel disk 33 are formed on the edges of the bushing shaft 32. Between the driving gear 31 and the reel disk 33, a friction gear 34 having a larger diameter than that of the driving gear 31 is rotatably seated on the bushing shaft 32. Also, a disk pad 35 as a friction member is interposed between the friction gear 34 and driving gear 31.

A spring 36 for biasing the friction gear 34 toward the driving gear 31 is interposed between the reel disk 33 and friction gear 34. Preferably, a washer 37 is interposed between the spring 36 and friction gear 34, and a spacer 38 is interposed between the friction gear 34 and driving gear 31.

According to this structure, since the driving gear 31 and reel disk 33 are combined with each other by the ribs 32a, they always rotate together. However, since the friction gear 34 is rotated by way of the disk pad 35, it is not always rotated with the driving gear 31 and reel disk 33.

Figure 4:
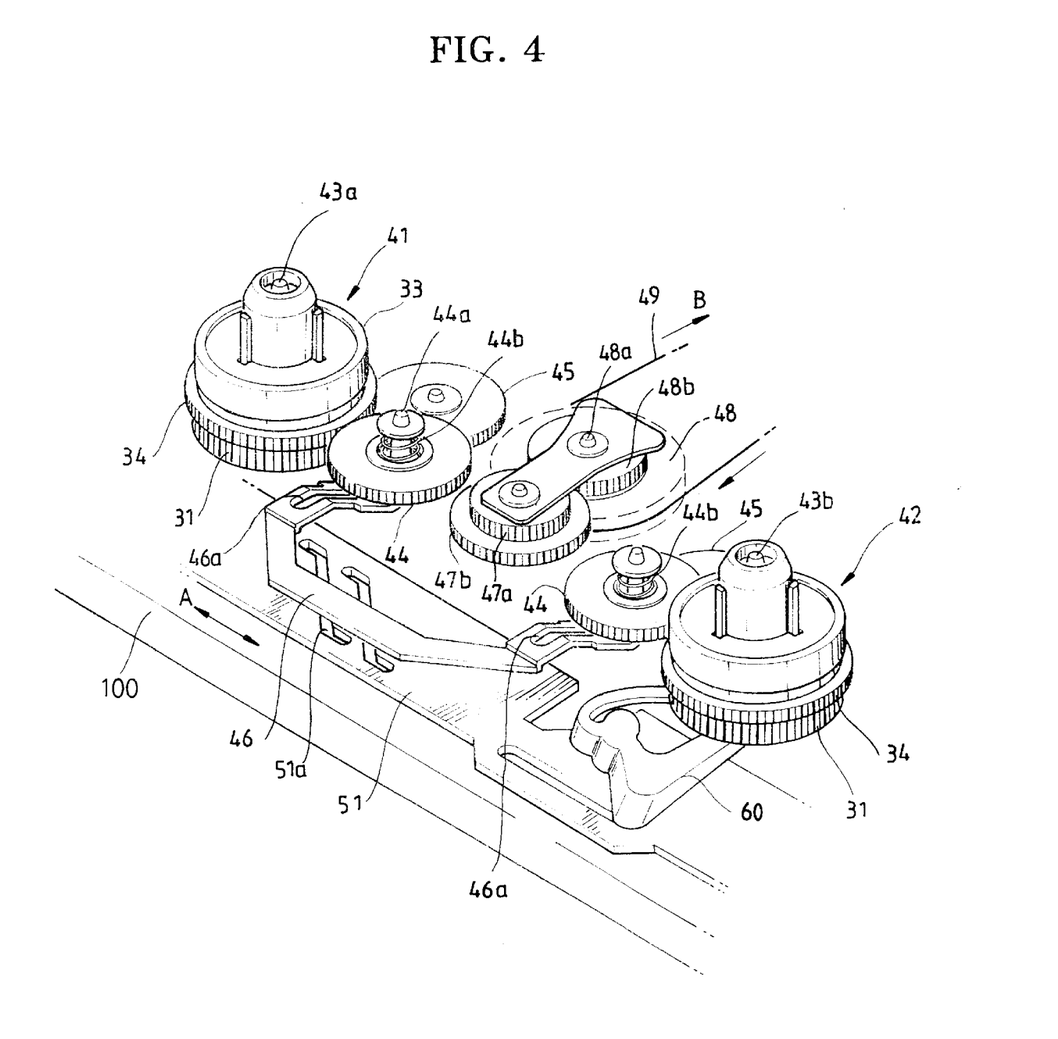
FIG. 4 is a perspective view of the reel table driving apparatus for a tape cassette recorder according to the present invention.

Referring to FIG. 4, reel tables 41 and 42 having such a configuration are rotatably installed on shafts 43a and 43b fixed on a main plate 100. Supply and take-up reels of a cassette (not shown) are respectively seated on the reel tables 41 and 42. The respective friction gears 34 of the reel tables 41 and 42 receive a driving force through first intermediate gears 44 which are selectively engaged with the respective friction gears 34 while moving up or down. The first intermediate gears 44 ascend and descend via elevating means including a lever member 46 having projecting portions in which sloped slots 46a to be combined with shafts 44a of the first intermediate gears 44 are formed, and elastic means 44b on the upper part of the first intermediate gears 44. As noted above, a spring can be provided as the elastic means 44b. Protrusions 46b (see FIG. 5) sliding along Z-shaped slots 51a formed on a slider 51 are formed on the lower surface of the lever member 46. The lever member 46 reciprocates perpendicular to a direction A of the slider 51.

The driving gears 31 of the reel tables 41 and 42 each are always in mesh with second intermediate gears 45 such that the driving force of a driving motor such as a capstan motor (not shown) is transmitted thereto.

The first and second intermediate gears 44 and 45 are selectively meshed with idler gears 47a and 47b which pivot about an idler shaft 48a in accordance with the tape travel direction (forward or backward). The idler gears 47a and 47b receive the driving force through a pulley 48 and a pulley gear 48b combined with the idler shaft 48a under the main plate 100. The pulley 48 is connected to the driving motor via a belt 49. As shown in FIG. 4, the diameter of the idler gear 47a is smaller than that of the idler gear 47b.

An action of the reel table driving apparatus for a tape cassette recorder according to the present invention will be described with reference to FIGS. 4, 5 and 6.

Figure 5:
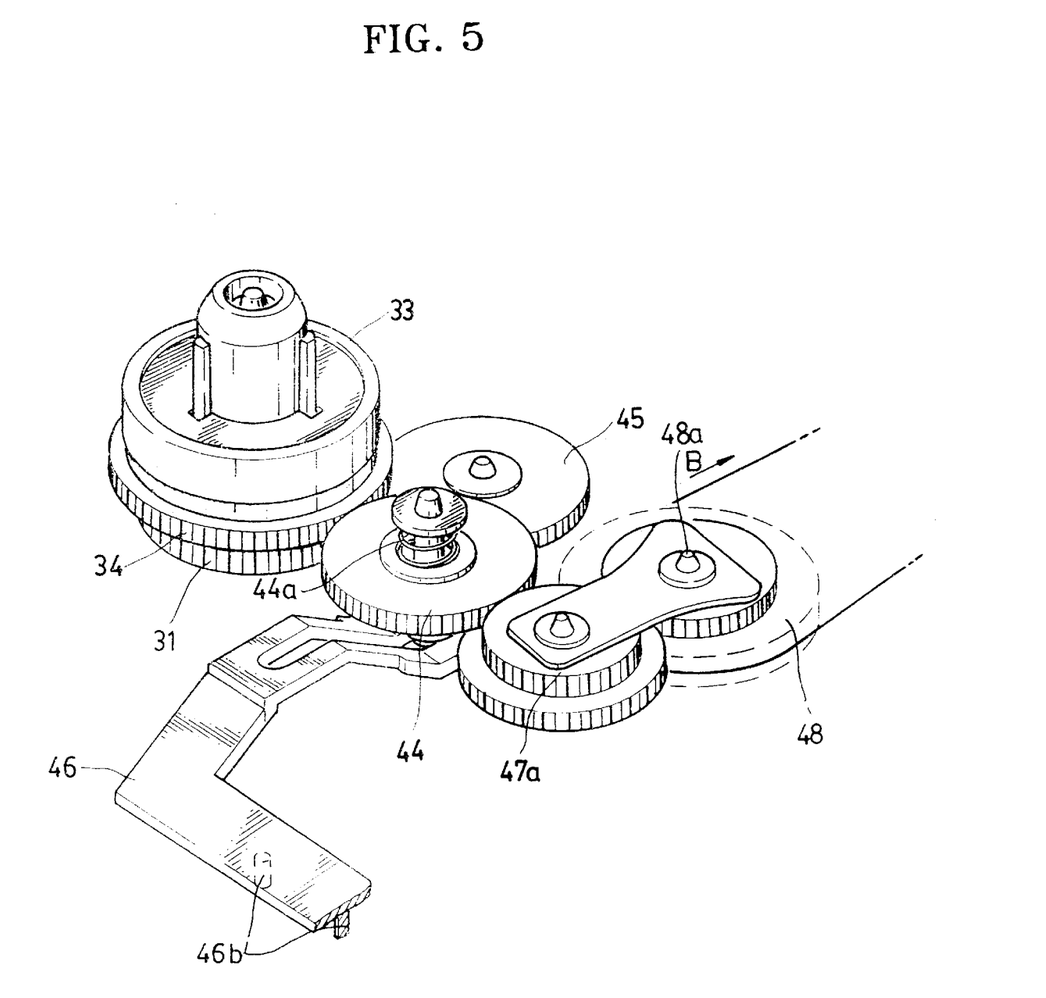
FIG. 5 is a partial perspective view showing the playback or review mode state of the reel table driving apparatus for a tape cassette recorder according to the present invention.

As shown in FIG. 4, the state of the reel table driving apparatus upon a review mode where the pulley 48 is rotated in a B direction is shown in FIG. 5. As the pulley 48 rotates in the B direction, the idler gear 47a is engaged with the first intermediate gear 44 by pivoting around the idler shaft 48a. The first intermediate gear 44 is elastically supported by the elastic means 44b on the upper part thereof and engaged with the friction gear 34. Thus, the driving force transmitted from the idler gear 47a is transmitted to the friction gear 34. When the friction gear 34 rotates, the driving gear 31 is also rotated by the disk pad 35 (see FIG. 3) installed under the driving gear, thereby rotating the reel disk 33 combined with the driving gear. At this time, the second intermediate gear 45 engaged with the driving gear 31 is rotated according to the rotation of the driving gear 31 without being loaded.

Thus, since the rotation speed ratio is increased while the driving force is transmitted through the idler gear 47a, the first intermediate gear 44 and the friction gear 34, the reel disk 33 rotates at a low speed.

If the reel disk 33 is accidentally loaded and thus decelerated or stopped, the driving gear 31 incorporated therewith is also paused, but the friction gear 34 in contact with the disk pad 35 keeps rotating. Therefore, the stretching or breakage (snapping) of the tape can be prevented.

Unlike the review mode, in the playback mode, the pulley 48 is rotated in the direction opposite to the B direction, the idler gear 47a is engaged with the first intermediate gear 44 beside the take-up reel table 42, and then the first intermediate gear 44 is engaged with the friction gear 34 on the take-up reel table 42 to thus reverse the direction of tape travel. However, the action is the same as that in the review mode.

Figure 6:
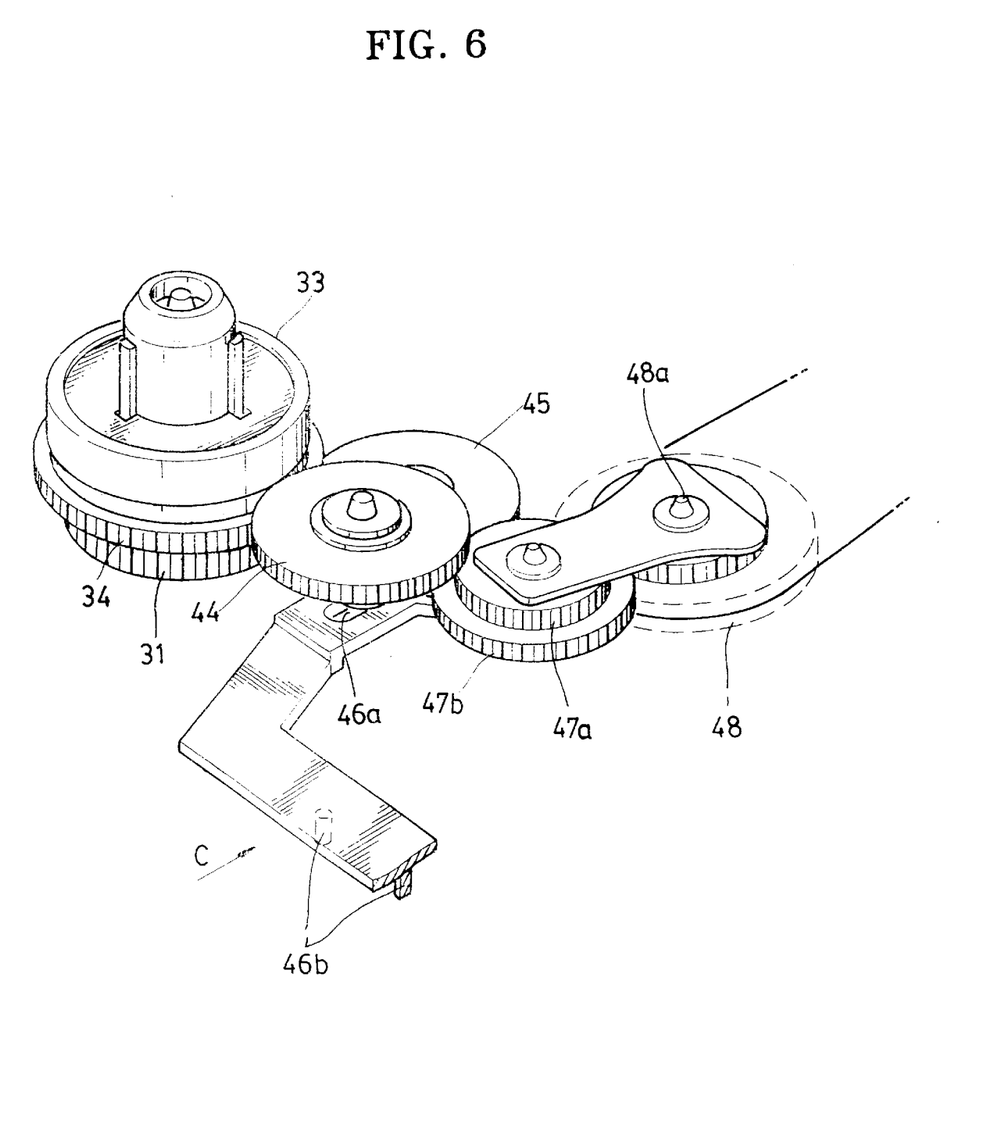
FIG. 6 is a partial perspective view showing the rewind or fast-forward mode state of the reel table driving apparatus for a tape cassette recorder according to the present invention.

Meanwhile, a state of the reel table driving apparatus according to the present invention in the rewind mode is shown in FIG. 6. If the mode is converted into the rewind mode, the slider 51 of FIG. 4 makes a rectilinear movement in the A direction (see FIG. 4) and the protrusions 46b on the lever member 46 are sliding in the slots 51a of the slider, and thus the lever member 46 moves in an arrow direction (C) perpendicular to the A direction movement of the slider. Thus, since the lever member 46 is moved toward the first intermediate gear 44 elastically supported by the spring 44a, the first intermediate gear 44 ascends along the sloped slot 46a on the lever member and thus becomes separated from the friction gear 34. At this time, the idler gear 47b pivots around the idler shaft 48a and is then engaged with the second intermediate gear 45. Since the second intermediate gear 45 is always engaged with the driving gear 31 on the reel table 41, the driving force of the driving motor is transmitted through the pulley 48, idler gear 47b and second intermediate gear 45, to the driving gear 31. Thus, the reel disk 33 incorporated with the driving gear 31 is also rotated. In such a state, since the driving force is transmitted through the idler gear 47b, second intermediate gear 45 and driving gear 31 to the reel disk 33, the reel disk 33 is rotated at a relatively high speed as compared with in the review mode.

Unlike the rewind mode, in the fast-forward mode, the pulley 48 is rotated in the direction opposite to the B direction, the idler gear 47b is engaged with the second intermediate gear 45 beside the take-up reel table 42, and then the second intermediate gear 45 is engaged with the driving gear 31 on the take-up reel table 42 to thus reverse the direction of tape travel. However, the action is the same as that in the rewind mode.

Referring to FIG. 4, a brake member 60 for controlling speed or maintaining the tape tension during the rotation of the reel table can be interlocked with the slider 51 and extend to cooperate with the lower surface of the reel table 41 or 42.

A reel table driving apparatus for a tape cassette according to another embodiment of the present invention will be described with reference to FIG. 7.

Figure 7:
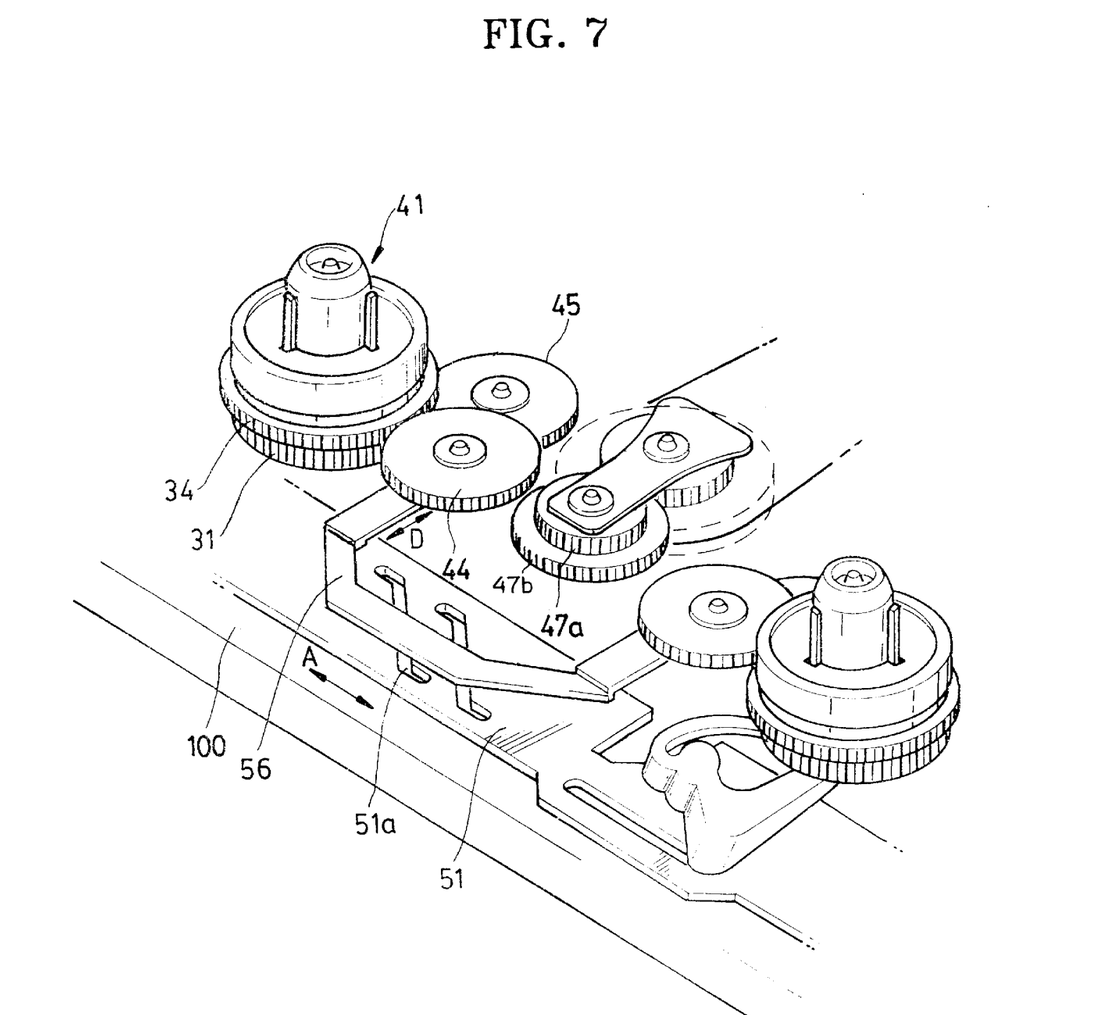
FIG. 7 is a perspective view of a reel table driving apparatus for a tape cassette recorder according to another embodiment of the present invention.

As shown in FIG. 7, the first intermediate gear 44 is combined with a plate member 56. In this case, the plate member 56 can move in a direction (D) by the protrusions 46b of FIG. 6 moving along the slots 51a in accordance with movement of the slider 51 in the A direction.

In the playback and review modes, the idler gear 47a is engaged with the first intermediate gear 44 so that the driving force is transmitted through the friction gear 34 to the reel disk 33.

In the rewind and fast-forward modes, the plate member 56 is moved in the D direction via the rectilinear movement of the slider 51. Thus, the first intermediate gear 44, which is rotatably mounted to a projecting portion of the plate member 56, is slipped out of engagement with the friction gear 34 and the idler gear 47a to then be separated therefrom. Next, the idler gear 47b pivots to then be meshed with the second intermediate gear 45 as described above, whereby the driving force is transmitted to the driving gear 31 in engagement with the second intermediate gear 45.

As described above, in the reel table driving apparatus for a tape cassette recorder according to the present invention, the clutch means is installed on the reel table such that the apparatus becomes slimmer and a special pressing member is not necessary for supporting the intermediate gears. In addition, since the lock and locking groove are not provided therein, damage to a tape due to a malfunction can be solved fundamentally.

It is contemplated that numerous modifications may be made to the reel table driving apparatus of the present invention without departing from the spirit and scope of the invention as defined in the following claims.

What is claimed is:

1. A reel table driving apparatus for a tape cassette recorder, comprising:

a main plate;

a reel table having a reel disk rotatably installed on said main plate, a driving gear coaxially combined with said reel disk, for transmitting a driving force, and a friction gear having a larger diameter than that of said driving gear, for transmitting the driving force to said reel disk by a frictional engagement with said driving gear;

a first intermediate gear selectively engaged with said friction gear;

a second intermediate gear engaged with said driving gear;

elevating means for elevating said first intermediate gear to be engaged with said friction gear in a low-speed mode and separated from said friction gear in a high-speed mode; and an idler mechanism having a first idler gear corresponding to said first intermediate gear and a second idler gear corresponding to said second intermediate gear, coaxially installed with said first idler gear and having a larger diameter than that of said first idler gear, such that said first idler gear is engaged with said first intermediate gear in the low-speed mode and said second idler gear is engaged with said second intermediate gear in the high-speed mode.

2. The reel table driving apparatus for a tape cassette recorder as claimed in claim 1, wherein said reel table further comprises a disk pad interposed between said friction and driving gears, and a first spring installed between said reel disk and said friction gear, for elastically biasing said friction gear and said disk pad toward said driving gear.

3. The reel table driving apparatus for a tape cassette recorder as claimed in claim 1, wherein said elevating means comprises a slider installed on said main plate, for making a rectilinear movement in accordance with mode conversion; and a lever member, slidably connected to said slider, for elevating said first intermediate gear by moving toward or away from said first intermediate gear in accordance with the rectilinear movement of the slider.

4. The reel table driving apparatus for a tape cassette recorder as claimed in claim 3, wherein a slot is formed in said slider in a direction which is diagonal to a direction of the rectilinear movement of said slider, a protrusion for moving along said slot is formed on a bottom surface of said lever member, and a sloped slot, in which a rotating shaft of said first intermediate gear slides, is formed on a projecting portion of said lever member such that said first intermediate gear ascends and descends in accordance with the relative movement of said sloped slot and the rotating shaft.

5. The reel table driving apparatus for a tape cassette recorder as claimed in claim 4, wherein a spring for elastically biasing said first intermediate gear downward is provided on the rotating shaft of said first intermediate gear.

6. The reel table driving apparatus for a tape cassette recorder as claimed in claim 1, wherein said elevating means includes a slider installed on said main plate, for making a rectilinear movement in accordance with mode conversion; and a plate member slidably connected to said slider and reciprocating in accordance with the rectilinear movement of said slider, to engage said first intermediate gear with or separate said first intermediate gear from said friction gear.

7. The reel table driving apparatus for a tape cassette recorder as claimed in claim 6, wherein a slot is formed in said slider in a direction which is diagonal to a direction of the rectilinear movement of said slider, a protrusion for moving along said slot is formed on a bottom surface of said plate member, and said first intermediate gear is rotatably mounted on a projecting portion of said plate member such that said first intermediate gear moves perpendicularly with respect to said slider.

8. The reel table driving apparatus for a tape cassette recorder as claimed in claim 1, further comprising a brake member interlocked with said slider to control the rotation speed of said reel table.

9. A reel table driving apparatus for a tape cassette recorder, comprising:

a main plate;

a reel table having a reel disk rotatably installed on said main plate, a driving gear coaxially combined with said reel disk, for transmitting a driving force, and a friction gear having a larger diameter than that of said driving gear, for transmitting the driving force to said reel disk by a frictional engagement with said driving gear;

a first intermediate gear selectively engaged with said friction gear;

a second intermediate gear engaged with said driving gear;

an elevating mechanism comprising a slider installed on said main plate, for making a rectilinear movement in accordance with mode conversion; and a lever member, slidably connected to said slider, for elevating said first intermediate gear by moving toward or away from said first intermediate gear in accordance with the rectilinear movement of the slider, thereby to elevate said first intermediate gear to be engaged with said friction gear in a low-speed mode and separated from said friction gear in a high-speed mode; and an idler mechanism having a first idler gear corresponding to said first intermediate gear and a second idler gear corresponding to said second intermediate gear, coaxially installed with said first idler gear and having a larger diameter than that of said first idler gear, such that said first idler gear is engaged with said first intermediate gear in the low-speed mode and said second idler gear is engaged with said second intermediate gear in the high-speed mode.

* * * * *